Dec. 27, 1938.   K. T. PENICK ET AL   2,141,404
STUFFING BOX
Filed April 13, 1936

Inventors
Kirby T. Penick
Arthur J. Penick
By Hardway & Lathey
Attorneys

Patented Dec. 27, 1938

2,141,404

UNITED STATES PATENT OFFICE 2,141,404

STUFFING BOX

Kirby T. Penick and Arthur J. Penick, Houston, Tex.

Application April 13, 1936, Serial No. 74,176

3 Claims. (Cl. 285—22)

This invention relates to a stuffing box.

An object of the invention is to provide a stuffing box of the character described specially designed for forming a fluid tight joint between adjacent parts.

The type of stuffing box herein described is particularly useful for forming and maintaining a fluid tight joint between adjacent parts.

It is another object of the invention to provide a stuffing box which includes packing and means for confining the packing between the adjacent parts and having a reserve supply of the packing material with a novel arrangement whereby the loss of packing material due to wear may be supplied from the available reserve supply of packing material, whereby the joint may be readily maintained fluid tight.

With the above and other objects in view the invention has particular relation to certain novel features of construction, arrangement of parts and use, an example of which is given in this specification and illustrated in the accompanying drawing, wherein:—

Figure 1:
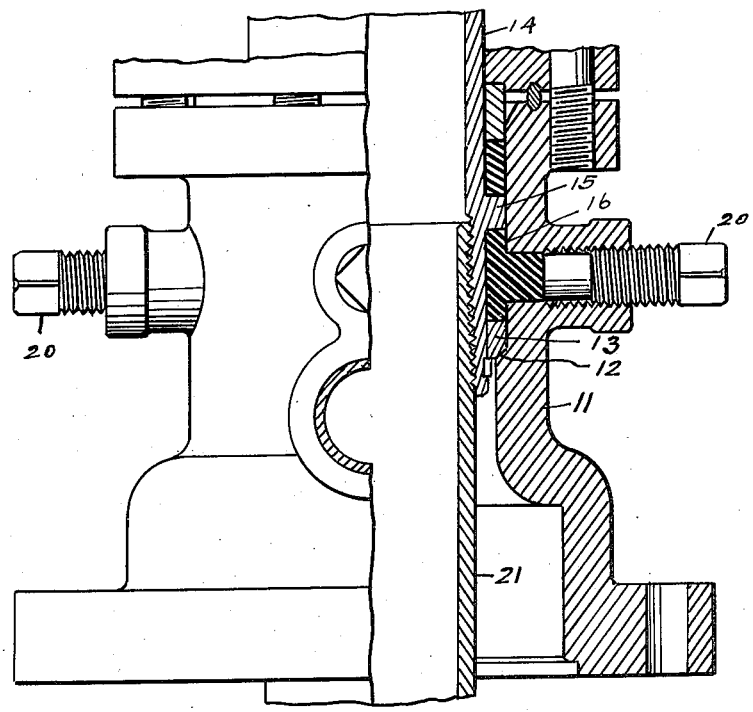
Figure 1 shows a side view partly in section of a well head illustrating an application of the invention.
Figure 2:
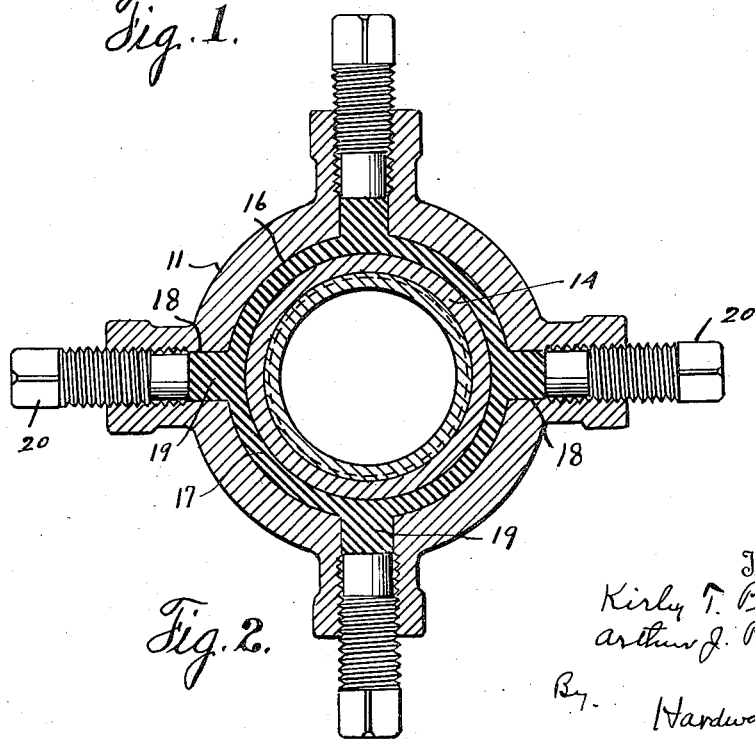
Figure 2 shows a horizontal cross sectional view thereof.

Referring now more particularly to the drawing wherein like numerals of reference designate similar parts in each of the figures, the numeral 11 designates a well head having the inside annular seat 12 on which the retainer ring 13 is supported. In the head there is a tubular hanger 14 which fits closely within the ring 13 and which has an external annular rib 15 which fits closely within the head. Accordingly between the rib 15 and the ring 13 there is an annular channel 16 extending entirely around the hanger and forming a space for the packing 17. Radiating from this space through the head are the bores 18 into which the packing extends forming reserve supplies 19.

The outer ends of the bores 18 are internally threaded to receive the jack screws 20 which are threaded therein and whose inner ends fit snugly in the smooth portions of the bores, and against the packing 19.

An inner pipe 21 depends from the hanger into the well.

Should a leak develop between the head and inner pipe by reason of strong well pressure the jack screws 20 may be tightened up and the packing material caused to flow from the reserve supplies 19, into the channel 16, to take up the loss from wear and to thereby form and maintain a leak proof joint between the adjacent parts.

The drawing and description disclose what is now considered to be a preferred form of the invention by way of illustration only, while the broad principle of the invention will be defined by the appended claims.

What we claim is:

1. A tubular well head having an inside seat, a retainer ring on the seat, a hanger fitted closely through the ring and having an external annular rib formed integrally therewith and arranged to fit closely in the head and to provide an annular channel around the hanger, said head having a radial bore communicating with the channel, packing filling the channel and supporting the rib and extended into the bore, a jack screw threaded into the bore and abutting the packing extending into said bore and forming means for forcing the reserve supply of packing into the channel to take up the wear.

2. A tubular well head having an inside seat and an outlet connection beneath said seat, a ring on said seat, a tubular hanger in the head having an external annular rib integral therewith and which fits closely in the head forming an annular channel around the hanger between the rib and ring, said head having radial bores which communicate with said channel, resilient packing filling the channel and supporting said rib and hanger and having reserve supplies of packing extended into the bores, jack screws threaded into the bores whose inner ends abut said reserve supplies of packing whereby the jack screws may be screwed inwardly to effect replacement, from said reserve supplies, of packing displaced from the channel.

3. A tubular well head having an inside seat and an outlet connection beneath said seat, a tubular hanger in the head having an external annular rib integral therewith and which fits closely in the head forming an annular channel around the hanger between the rib and seat, said head having radial bores which communicate with said channel, resilient packing filling the channel and supporting the rib and having reserve supplies of packing extended into the bores, jack screws threaded into the bores whose inner ends abut said reserve supplies of packing whereby the jack screws may be screwed inwardly to effect replacement, from said reserve supplies, of packing displaced from the channel, annular packing around the hanger resting on said rib and a ring around the hanger clamped against the upper end of said last mentioned packing.

KIRBY T. PENICK.
ARTHUR J. PENICK.